(12) United States Patent
Harberts et al.

(10) Patent No.: US 12,140,202 B2
(45) Date of Patent: Nov. 12, 2024

(54) TOOTHED BELTS INCLUDING TEETH WITH ASYMMETRIC PROFILE

(71) Applicant: GATES CORPORATION, Denver, CO (US)

(72) Inventors: Jordyn Harberts, Englewood, CO (US); Elizabeth Amici, Englewood, CO (US)

(73) Assignee: Gates Corporation, Denver, CO (US)

(*) Notice: Subject to any disclaimer, the term of this patent is extended or adjusted under 35 U.S.C. 154(b) by 0 days.

(21) Appl. No.: 18/448,052

(22) Filed: Aug. 10, 2023

(65) Prior Publication Data

US 2024/0052911 A1 Feb. 15, 2024

Related U.S. Application Data

(60) Provisional application No. 63/396,599, filed on Aug. 10, 2022.

(51) Int. Cl.
*F16G 1/28* (2006.01)
*F16H 7/02* (2006.01)

(52) U.S. Cl.
CPC ............... *F16G 1/28* (2013.01); *F16H 7/02* (2013.01)

(58) Field of Classification Search
CPC ..... F16G 1/28; F16G 7/02; F16G 1/00; F16H 7/023
USPC .................................................. 474/202, 205
See application file for complete search history.

(56) References Cited

U.S. PATENT DOCUMENTS

| | | | | |
|---|---|---|---|---|
| 3,083,582 A * | 4/1963 | Wheeler | ................ | F16H 7/023 474/205 |
| 4,007,644 A * | 2/1977 | Weinberger | ............... | F16G 1/28 474/205 |
| 4,047,444 A * | 9/1977 | Jeffrey | .................... | F16H 7/023 474/148 |
| RE30,440 E * | 12/1980 | Jeffrey | .................... | F16H 7/023 474/148 |
| 4,468,211 A * | 8/1984 | Hoshiro | .................. | F16H 7/023 474/205 |
| 4,586,915 A * | 5/1986 | Cathey | .................... | F16H 7/023 474/205 |
| 4,614,510 A * | 9/1986 | Nishikori | .................. | F16G 1/28 474/205 |
| 5,015,218 A * | 5/1991 | Macchiarulo | ............. | F16G 1/28 474/205 |
| 5,662,541 A * | 9/1997 | Roovers | .................. | F16H 7/023 474/205 |
| 5,957,797 A * | 9/1999 | Hong | .................. | F16H 61/6625 474/205 |
| 6,135,907 A * | 10/2000 | Hong | ........................ | F16G 1/28 474/205 |
| 7,841,463 B2 * | 11/2010 | DeGroot | ................ | B65G 15/42 474/205 |

(Continued)

FOREIGN PATENT DOCUMENTS

DE 9101867 U1 5/1991

*Primary Examiner* — Henry Y Liu
(74) *Attorney, Agent, or Firm* — Kevin J. Aiken, Esq.

(57) ABSTRACT

A toothed belt including asymmetric tooth profiles. The teeth of the toothed belt include a vertical segment on the leading side of the tooth that allows the teeth to carry increased loads. This in turn helps prevent tooth jump. A sprocket configured to smoothly enter and exit the toothed belt is also described, and the toothed belt and sprocket may form part of a belt drive system.

20 Claims, 2 Drawing Sheets

(56) References Cited

U.S. PATENT DOCUMENTS

| | | | | |
|---|---|---|---|---|
| 7,967,131 B2* | 6/2011 | DeGroot | ................ | B65G 15/42 |
| | | | | 474/205 |
| 8,480,109 B1* | 7/2013 | Adams | .................... | B62M 9/02 |
| | | | | 280/261 |
| 8,859,081 B2* | 10/2014 | Baldovino | .............. | B32B 25/10 |
| | | | | 524/565 |
| 9,493,306 B2* | 11/2016 | Niewmierzycki | ........................... | |
| | | | | H01L 21/68707 |
| 10,161,487 B2* | 12/2018 | Pease | ................... | F16H 55/171 |
| 10,436,286 B2* | 10/2019 | Matsukawa | ............. | F16H 7/023 |
| 11,654,645 B2* | 5/2023 | Tamura | .................. | B32B 5/026 |
| | | | | 474/205 |
| 2009/0156341 A1* | 6/2009 | Gaynor | ................ | F16H 55/171 |
| | | | | 474/153 |
| 2009/0264235 A1* | 10/2009 | Monti | .................... | F16H 55/36 |
| | | | | 474/205 |
| 2010/0184547 A1* | 7/2010 | Clarke | .................. | F16H 55/171 |
| | | | | 474/206 |
| 2010/0279808 A1* | 11/2010 | Fan | .......................... | F16G 5/20 |
| | | | | 474/205 |
| 2012/0058851 A1* | 3/2012 | Shimizu | .................. | F16H 7/023 |
| | | | | 474/205 |
| 2012/0094795 A1* | 4/2012 | Wang | ....................... | F16G 5/20 |
| | | | | 474/205 |
| 2016/0069420 A1* | 3/2016 | Sekiguchi | ................. | F16G 1/10 |
| | | | | 264/157 |
| 2018/0259043 A1* | 9/2018 | Pease | ....................... | F16G 1/08 |

* cited by examiner

TOOTHED BELTS INCLUDING TEETH WITH ASYMMETRIC PROFILE

CROSS-REFERENCE

This application claims priority to U.S. provisional application 63/396,599 filed Aug. 10, 2022 and titled TOOTHED BELTS INCLUDING TEETH WITH ASYMMETRIC PROFILES, the entire disclosure of which is incorporated herein by reference for all purposes.

BACKGROUND

When a shock load is applied to a drive system composed of a toothed belt and a sprocket, the teeth of the belt can jump over the sprocket tooth into the next groove in the direction the belt is turning. This occurrence is often referenced as "tooth jump." Tooth jump can cause issues in the operation of the drive system, as well as in delamination of the belt, tooth wear, material fatigue, and ultimately belt failure.

Another issue that may arise with drive systems composed of a toothed belt and a sprocket is poor meshing between the belt and sprocket profiles. Poor meshing can create noise. Because noise reduction is one of the main advantages of belt drives over chain drives, the creation of noise from poor meshing in a belt drive system is highly undesirable.

A number of design strategies for toothed belt and pulley or sprocket profiles have been proposed. Representative of the art is U.S. Pub No 2009/0156341, which discloses a belt and sprocket system, the belt having a tensile cord disposed within a belt body, a tooth projecting from the belt body, the tooth having a profile having at least two unequal radii connected in series and disposed between a tooth tip and a tooth root, the sprocket having a groove for receiving the tooth, the groove profile comprising at least one substantially linear portion disposed between the at least two unequal radii, a tooth tip engaging a predetermined portion of the sprocket groove such that the tensile cord is supported in a manner to cause the tensile cord to have a substantially arcuate form between the tooth roots. However, this design, as well as others, typically focus on the tooth tip engagement with a sprocket, rather than engagement of the leading side of the belt tooth against which force is exerted.

Accordingly, a need exists for improvements in belt drive systems, with specific focus on solving issues relating to tooth jump and noise creation.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some embodiments, a toothed belt is described, the toothed belt generally including a main belt body portion, and a plurality of teeth spaced apart about the whole inner circumference of the belt and extending in a radially inward direction from the main belt body portion. Each tooth of the toothed belt generally has a height extending from a land to a tip of the tooth, and the cross-sectional profile of each tooth includes a vertical segment at a leading side of the tooth, the vertical segment being oriented substantially perpendicular to the main belt body portion when the toothed belt is in a rack state. The length of the vertical segment of each tooth is less than the height of the tooth.

In some embodiments, a belt drive system is described, the belt drive system generally including a toothed belt as described in the preceding paragraph, and a sprocket configured for engaging with and rotating the toothed belt. The sprocket includes a plurality of teeth, wherein the shape of each tooth of the sprocket and the spacing between adjacent teeth in the sprocket are configured to smoothly mesh with the teeth of the toothed belt.

These and other aspects of the technology described herein will be apparent after consideration of the Detailed Description and Figures herein. It is to be understood, however, that the scope of the claimed subject matter shall be determined by the claims as issued and not by whether given subject matter addresses any or all issues noted in the Background or includes any features or aspects recited in the Summary.

BRIEF DESCRIPTION OF THE DRAWINGS

Non-limiting and non-exhaustive embodiments of the disclosed technology, including the preferred embodiment, are described with reference to the following figures, wherein like reference numerals refer to like parts throughout the various views unless otherwise specified.

DETAILED DESCRIPTION

Embodiments are described more fully below with reference to the accompanying Figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 1:
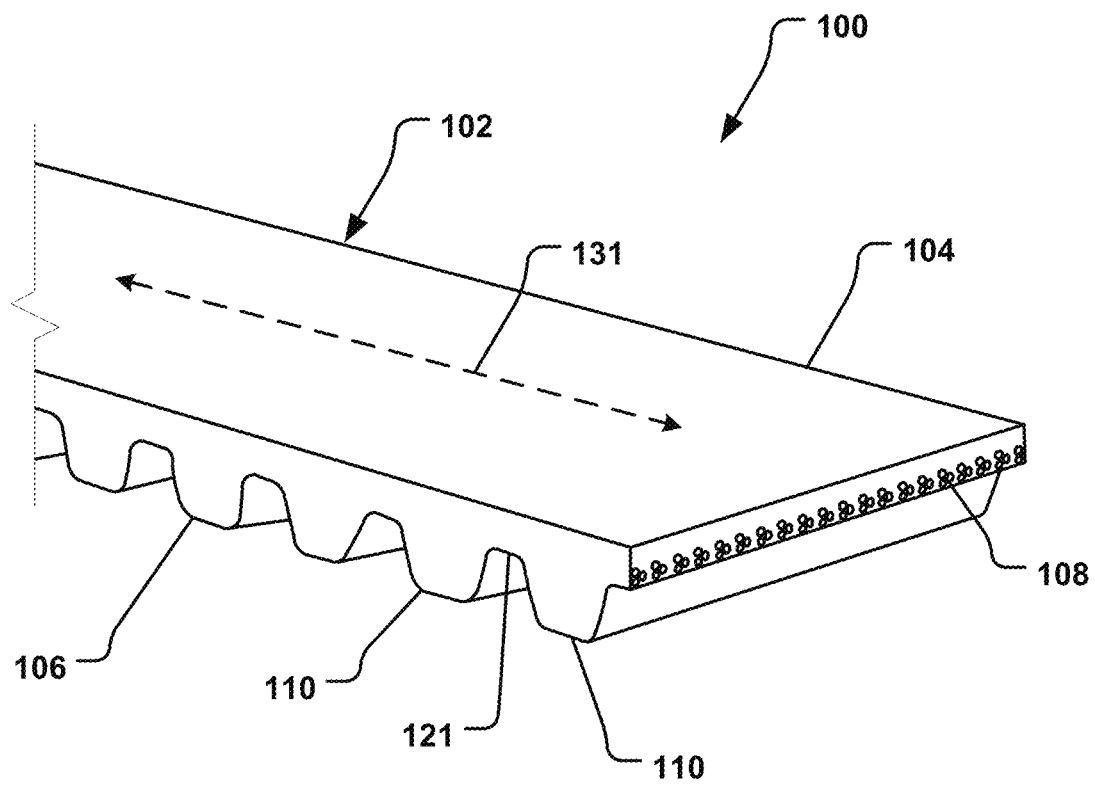
FIG. 1 is a perspective view of a toothed belt.

FIG. 1 shows a generic belt 100 having a main belt body portion 102 formed of a flexible material having a back side 104 and a front side 106 with a plurality of load carrying cords 108 within the body portion 102, the particular cords 108 bound in triplicate bundles although in other embodiments the cords 108 may be single cords or otherwise bundled. The cords 108 may be, e.g., carbon cords, polymeric cords (e.g., polyester, aramid), fiberglass cords, etc. Defined in the front side 106 are a plurality of teeth 110; although trapezoidal teeth are generically depicted in FIG. 1 for explanation purposes only, it is understood that the belt 100 can have an asymmetrical tooth shape in accordance with various embodiments described herein. Present between adjacent teeth 110 is a land 121.

Each individual tooth 110 extends perpendicular to the longitudinal length of the belt 100 so that the plurality of teeth 110 run along or around the length of the belt 100. In use, the teeth 110 on the front side 106 are in contact with a drive mechanism, e.g., a toothed gear or sprocket. Although not seen in FIG. 1, the belt 100 is an endless belt, having the form of a loop with no beginning and no end. In FIG. 1, the toothed belt 100 is shown in a rack state, meaning the belt 100 is laid flat, rather than having any degree of curvature. In this rack state, the belt 100 includes a longitudinal axis 131.

Figure 2A:
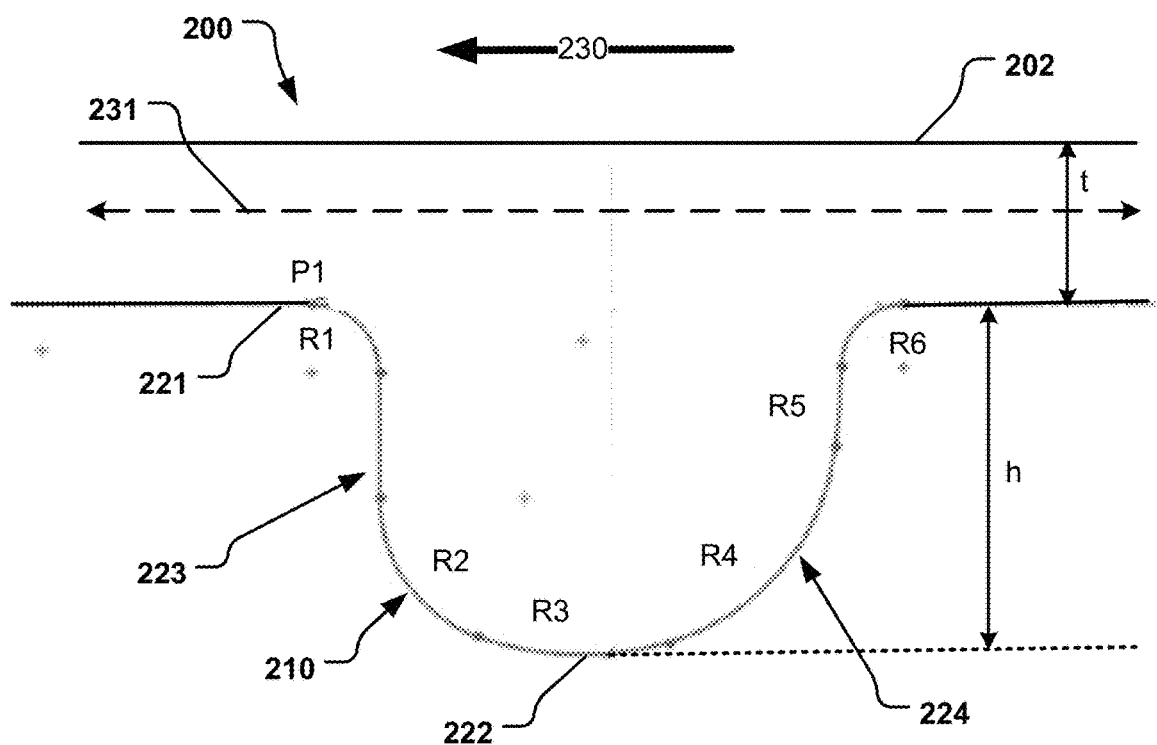
FIG. 2A is a side plan view of a section of a toothed belt, showing the profile of a tooth configured in accordance with various embodiments described herein.

With respect to FIG. 2A, a toothed belt 200 configured in accordance with various embodiments described herein is shown. The toothed belt 200 generally includes a main belt body portion 202 and a plurality of teeth 210 extending from the body portion 202 in a radially inward direction, e.g., when the belt is looped, such as an endless belt. The main body portion may have a thickness t, which is generally not limited and may vary based on the specific application of the belt 200. In FIG. 2A, the toothed belt 200 is shown in a rack state; in this rack state, the belt 200 includes a longitudinal axis 231.

While FIG. 2A shows a single tooth 210, it should be appreciated that multiple teeth 210 are arranged around the entire inner circumference portion of the main body portion 202 and are spaced apart from each other at even intervals with a land 221 present between adjacent teeth 210, as shown in FIG. 1. It should further be appreciated that each tooth 210 included in the belt 200 is generally identical in shape and size (the specifics of which are discussed in greater detail below).

As further shown in FIG. 2A, each tooth 210 has a height h extending from the land 221 adjacent the tooth 210 to a tip 222 of the tooth; the maximum height h may not be at the center of the tooth 210. Each tooth 210 further includes a leading side 223 and a trailing side 224, based on the direction of travel of the belt 200; FIG. 2A includes an arrow 230 indicating the direction of travel of the belt 200. The leading side 223 is the side of the tooth 210 against which force is exerted, typically via a tooth of a sprocket pushing against the leading side 223 in order to move the toothed belt 200 in the direction indicated by arrow 230; the trailing side 224 is the side of the tooth 210 opposite the leading side 223.

As discussed in greater detail below, the trailing side 224 of each tooth 210 is generally shaped in order to provide for smooth meshing between the sprocket and the toothed belt 200, that is, to provide a smooth entry and exit of the sprocket teeth into the spaces between the teeth 210 of the toothed belt 200.

Figure 2B:
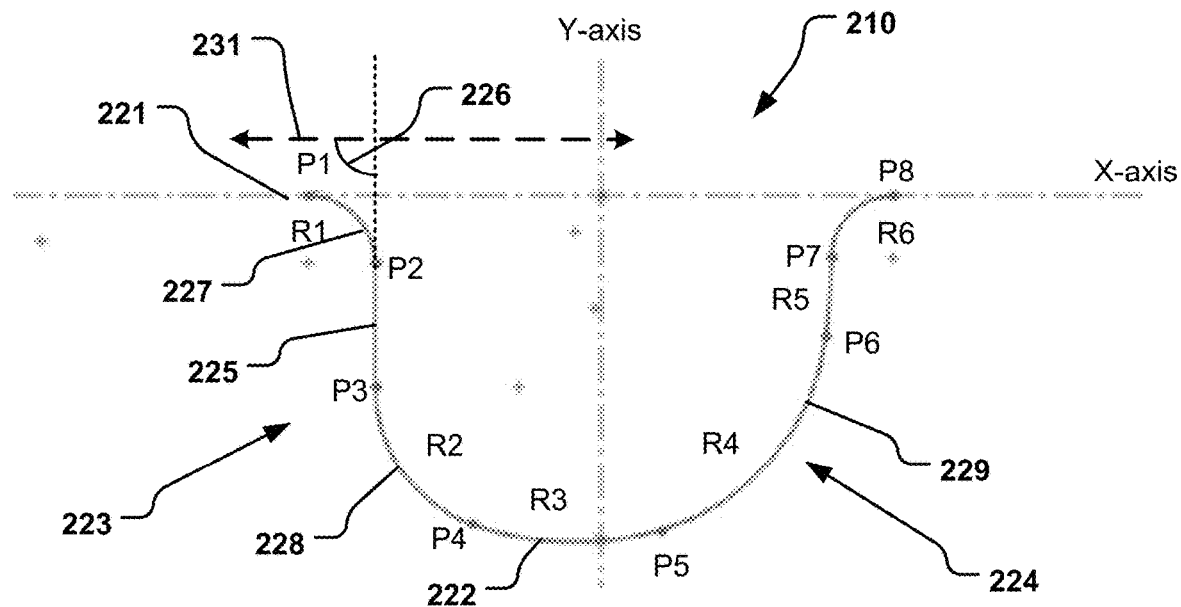
FIG. 2B is a cross-sectional view of the tooth of FIG. 2A, showing the profile of the tooth configured in accordance with various embodiments described herein.

With reference to FIG. 2B, the cross-sectional profile of the tooth 210 is shown. The cross-sectional profile of tooth 210 includes a vertical segment 225 between the land 221 and the tip 222 of the tooth 210 on the leading side 223 of the tooth 210. The vertical segment 225 is perpendicular (or, orthogonal) to the direction of the force applied to the tooth 210 by a tooth of a sprocket. This vertical segment 225 increases the load that can be carried by the tooth 210; this allows for greater forces to be applied to the belt without the belt experiencing tooth jumping over the teeth of the sprocket.

The vertical segment 225 is located between points P2 and P3 shown in FIG. 2B, with point P2 marking the radial outer end of vertical segment 225 and P3 marking the radial inner end of vertical segment 225, based on the belt being in a looped configuration. The vertical segment 225, when extended to intersect with the longitudinal axis 231 of the main body portion 202 when the belt 200 is in a rack (i.e., flat) state, forms an angle 226 with the longitudinal axis 231. To provide the desired vertical orientation for the vertical segment 225, angle 226 is generally 90°. In other words, the vertical segment 225 is generally oriented perpendicular to the longitudinal axis 231 and the main body portion 202. In some embodiments, the angle 226 need not be exactly 90°; for example, in some embodiments, angle 226 is within the range of from 86° to 110°, in which case the vertical segment 225 still provides the desired improvement in the amount of force that can be applied to the tooth 210 without resulting in tooth jump.

The length of the vertical segment 225 (measured between P2 and P3) is generally less than the height h of the tooth 210. Provided the length of the vertical segment 225 is less than the height h of the tooth 210, the length of the vertical segment 225 is generally not limited. In some embodiments, the length of the vertical segment 225 is from 10% to 90% of the height h of the tooth 210. In some embodiments, the length of the vertical segment 225 is from 30% to 60% of the height h of the tooth 210.

A vertical segment 225 that has a length that is less than the height h of the tooth 210 permits the leading side 223 of the tooth 210 to have a first curved portion 227 between the land 221 and the vertical segment 225, or, between the land 221 and the radial outer end P2; it also permits a second curved portion 228 between the vertical segment 225 and the tip 222 of the tooth 210, or, between the inner radial end P3 and the tip 222 of the tooth 210. The first curved portion 227 may generally be between points P1 and P2 shown in FIG. 2B, while the second curved portion 228 may generally be from point P3 to a point intermediate points P4 and P5. These curved portions 227, 228 provide gradual transitions near the junction of the tooth 210 and the main belt body portion 202 and near the tip 222 of the tooth 210. The first curved portion 227 and the second curved portion 228 may make manufacture of the tooth profile easier and may also contribute to better meshing between the toothed belt and the sprocket.

At the trailing side 224 of the tooth 210, a third curved portion 229 may be provided, the third curved portion 229 generally extending from the tip 222 of the tooth 210 down to the junction of the trailing side 223 of the tooth 210 and the main belt body portion. This third curved portion 229 may extend from a point intermediate points P4 and P5 down to point P8. The third curved portion 229 may therefore include convex and concave curved portions. In some embodiments, the third curved portion 229 is free of or substantially free of any vertical segment, such that the trailing side 224 of the tooth 210 does not include a vertically oriented segment (or, a segment that is or is substantially perpendicular to the main belt body portion). By providing a trailing side of the tooth 210 in this manner, the tooth profile disclosed herein allows for smooth entry and exit from the sprocket, which improves meshing and reduces noise.

Tables 1 and 2, below, provide exemplary, non-limiting, data for the location of points P1 through P8 and the radius of curvature R1 through R6 for the segments between adjacent points. This data is exemplary only, and the values for both the points P1 through P8 and R1 through R6 may be readily adjusted. The only constant for the given data is that there is no radius of curvature between points P2 and P3 since the segment between points P2 and P3 is the vertical segment 225.

Tables 1 and 2 utilize the axis shown in FIG. 2B, with the X-axis being the base of the tooth 210 (e.g., at the land 221) and the Y-axis is the center of the tooth 210, essentially equally between the base of the leading side 223 and the base of the trailing side 224. The Y-axis may or may not be the location of the tip 222; that is, the tip 222 may be offset from the center or Y-axis of the tooth 210. The data in the Tables is normalized, not having any units associated therewith.

The data in Table 2 indicates that the X location between points P2 and P3 does not change, thus indicating a perpendicular orientation for the vertical segment 225. However, in embodiments where the vertical segment is substantially vertical, e.g., oriented at an angle between 86° and 110°, the X location between points P2 and P3 may change slightly. Regardless, there is still no radius of curvature for this segment, as the vertical segment 225 is a straight segment.

TABLE 1

|  | Radius | Center Points | |
| --- | --- | --- | --- |
|  |  | X | Y |
| R1 | 0.98409 | −4.25987 | −0.98409 |
| R2 | 2.10558 | −1.17020 | −2.79115 |
| R3 | 4.49790 | −0.36940 | −0.53684 |
| R4 | 3.35269 | −0.05546 | −1.63818 |
| R5 | 11.49028 | −8.13396 | −0.65926 |
| R6 | 0.90600 | 4.25987 | −0.90600 |

TABLE 2

| | Segment Intersections | |
| --- | --- | --- |
| | X | Y |
| P1 | −4.25987 | 0 |
| P2 | −3.27578 | −0.98409 |
| P3 | −3.27578 | −2.79115 |
| P4 | −1.87502 | −4.77526 |
| P5 | 0.86362 | −4.86243 |
| P6 | 3.27288 | −2.04149 |
| P7 | 3.35405 | −0.88797 |
| P8 | 4.25987 | 0 |

As readily apparent from FIGS. 2A and 2B and Tables 1 and 2, in addition to having the vertical segment 225 on the trailing side 223, the tooth 210 and variations thereof in accordance with this disclosure are asymmetric around the Y-axis of the tooth, the trailing side 223 having a different profile than the leading side 224. In some embodiments, the leading side 224 may include a straight segment, although the overall profile of the leading side 224 is arcuate (concave, convex, or a combination thereof). The tooth tip 222 may be offset to either the trailing side 223 or the leading side 224.

As noted previously, the embodiments of the toothed belt described herein may be used with a sprocket for engaging with and rotating the toothed belt. The combination of the toothed belt and the sprocket can form a belt drive system. The sprocket generally includes teeth and grooves sized and shaped so as to provide a dynamic fit between the toothed belt and the sprocket that allows the sprocket teeth to smoothly enter and exit the toothed belt. More specifically, the shape of the sprocket teeth, the shape of the grooves between sprocket teeth, and the spacing between sprocket teeth are all designed to accommodate at least the vertical segment portion of the leading edge of the teeth of the toothed belt. This vertical segment may require the sprocket design to have a "scooped out" profile that accounts for the vertical segment on the teeth of the toothed belt. By providing a sprocket design specifically configured for engaging with the specific profile of the toothed belt (i.e., the vertical segment of the leading edge of the teeth of the toothed belt), the sprocket provides for smooth meshing with the teeth of the toothed belt, which may help both with belt drive system performance and noise reduction.

Any suitable method for making the toothed belts described herein can be used. In some embodiments, a toothed belt is made using a molding process, including a slab build molding process. When a molding process is used, molds are created to form teeth having the asymmetrical profile with vertical segment described herein.

The material of the toothed belt 100, 200 described herein is generally not limited, and any suitable material for the different components of the toothed belt can be used. Typically, the base material used for the main belt body portion 102, 202 and the teeth 110, 210 is a polymer material, such as a natural or synthetic rubber material, though other suitable materials may also be used (e.g., polyurethanes). Various filler materials may also be included within the material of the main belt body portion and/or teeth to add further structural stability to the belt, while in other embodiments, the belt may be free or substantially free of fillers. The toothed belt 100, 200 shown in FIGS. 1 and 2A may also include additional features not shown in the figures. For example, a cover layer may be provided on the exterior surface of the teeth 110, 210, a backing layer may be provided on the radially outer surface of the main belt body portion 102, 202, and/or a plurality of reinforcing fibers may be embedded within the main belt body portion 102, 202.

Various advantages are provided by way of the toothed belts as described herein. Some of these advantages have been previously discussed, such as the ability to carry a heavier load and noise reduction. Additionally, the toothed belts as described herein allow for greater hub loads compared existing profiles. With improved performance, it is possible to reduce belt widths for equivalent specifications or increase the range of applications compared to released tooth profiles. Furthermore, customers benefit from the design described herein with improved performance with respect to decreased noise and less tooth jump. High end drive system performance can be brought to mid-market applications at reduced cost.

From the foregoing, it will be appreciated that specific embodiments of the invention have been described herein for purposes of illustration, but that various modifications may be made without deviating from the scope of the invention. Accordingly, the invention is not limited except as by the appended claims.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended.

Unless otherwise indicated, all number or expressions, such as those expressing dimensions, physical characteristics, etc., used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying rounding techniques. Moreover, all ranges disclosed herein are to be understood to encompass and provide support for claims that recite any and all sub-ranges or any and all individual values subsumed therein. For example, a stated range of 1 to 10 should be considered to include and provide support for claims that recite any and all sub-ranges or individual values that are between and/or inclusive of the minimum value of 1 and the maximum value of 10; that is, all sub-ranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

We claim:

1. A toothed belt comprising:
   a main belt body portion; and
   a plurality of teeth evenly spaced apart about an inner circumference of the belt, each tooth extending in a radially inward direction from the main belt body portion, and each tooth having a height extending from a land to a tooth tip, wherein a cross-sectional profile of each tooth comprises:
   at a leading side of the tooth, a vertical segment oriented substantially perpendicular to a longitudinal axis of the main belt body portion when the toothed belt is in a rack state, the vertical segment having a length less than the height of the tooth.

2. The toothed belt of claim 1, the vertical segment forming an angle with respect to the longitudinal axis of the main belt body portion when the belt is in a rack state, the angle being from 86° to 110°.

3. The toothed belt of claim 2, wherein the angle of the vertical segment with respect to the longitudinal axis of the main belt body portion when the belt is in a rack state is 90°.

4. The toothed belt of claim 1, wherein the length of the vertical segment is from 10 to 90% of the tooth height.

5. The toothed belt of claim 1, wherein the length of the vertical segment is from 30 to 60% of the tooth height.

6. The toothed belt of claim 1, wherein the cross-sectional profile of each tooth further comprises:
   at the leading side of the tooth, a first curved portion extending from the land to a radial outer end of the vertical segment; and
   at the leading side of the tooth, a second curved portion extending from a radial inner end of the vertical segment to the tip of the tooth.

7. The toothed belt of claim 1, wherein the cross-sectional profile of each tooth further comprises:
   at a trailing side of the tooth, a third curved portion extending from the tip of the tooth to the land, the third curved portion being substantially free of a vertical segment.

8. The toothed belt of claim 7, wherein the third curved portion is configured to provide for smooth meshing between the toothed belt and a corresponding sprocket.

9. The toothed belt of claim 7, wherein the third portion is configured to provide for reduced noise during meshing between the toothed belt and a corresponding sprocket.

10. A belt drive system, comprising:
    a toothed belt, comprising:
      a main belt body portion; and
      a plurality of teeth evenly spaced apart about an inner circumference of the belt, each tooth extending in a radially inward direction from the main belt body portion, and each tooth having a height extending from a land to a tooth tip, wherein a cross-sectional profile of each tooth comprises:
        at a leading side of the tooth, a vertical segment oriented substantially perpendicular to a longitudinal axis of the main belt body portion when the toothed belt is in a rack state, the vertical segment having a length less than the height of the tooth; and
    a sprocket configured for engaging with and rotating the toothed belt, the sprocket comprising a plurality of teeth, wherein:
      the profile of each tooth of the sprocket and the spacing between adjacent teeth in the sprocket are configured to smoothly mesh with the teeth of the toothed belt.

11. The belt drive system of claim 10, wherein the profile of each tooth of the sprocket and the spacing between adjacent teeth in the sprocket are specifically adapted such that the sprocket accommodates the vertical segment of the teeth of the toothed belt.

12. The belt drive system of claim 11, wherein the vertical segment forms an angle with respect to the longitudinal axis of the main belt body portion when the belt is in a rack state, the angle in the range of from 86° to 110°.

13. The belt drive system of claim 12, wherein the angle of the vertical segment with respect to the longitudinal axis of the main belt body portion when the belt is in a rack state is 90°.

14. The belt drive system of claim 11, wherein the length of the vertical segment is from 10 to 90% of the tooth height.

15. The belt drive system of claim 11, wherein the length of the vertical segment is from 30 to 60% of the tooth height.

16. A toothed belt comprising:
    a main belt body portion having a longitudinal axis; and
    a plurality of teeth evenly spaced apart about an inner circumference of the belt, each tooth having a leading side and a trailing side and a height extending from a land to a tooth tip wherein:
      a cross-sectional profile of each tooth is asymmetrical about an Y-axis positioned equally between the land on the leading side and the land on the trailing side, and
      at the leading side of the tooth, the cross-section has a vertical segment oriented substantially perpendicular to the main belt body portion when the toothed belt is in a rack state, the vertical segment having a length less than the height of the tooth.

17. The toothed belt of claim 16, wherein the vertical segment has a length from 10 to 90% of the tooth height.

18. The toothed belt of claim 17, wherein the length of the vertical segment is from 30 to 60% of the tooth height.

19. The toothed belt of claim 16, the vertical segment forming an angle with respect to the main belt body portion when the belt is in a rack state, the angle being from 86° to 110°.

20. The toothed belt of claim 19, wherein the angle of the vertical segment with respect to the longitudinal axis of the main belt body portion when the belt is in a rack state is 90°.

* * * * *